United States Patent
Lidak

(10) Patent No.: US 9,388,862 B2
(45) Date of Patent: Jul. 12, 2016

(54) CONSTANT VELOCITY UNIVERSAL JOINT FOR HELICOPTER ROTOR

(71) Applicant: K4A S.R.L., Naples (IT)

(72) Inventor: Vladimiro Lidak, Montelibretti (IT)

(73) Assignee: K4A S.R.L., Naples (IT)

(*) Notice: Subject to any disclaimer, the term of this patent is extended or adjusted under 35 U.S.C. 154(b) by 0 days.

(21) Appl. No.: 14/353,163

(22) PCT Filed: Oct. 23, 2012

(86) PCT No.: PCT/IT2012/000322
§ 371 (c)(1),
(2) Date: Apr. 21, 2014

(87) PCT Pub. No.: WO2013/061348
PCT Pub. Date: May 2, 2013

(65) Prior Publication Data
US 2014/0302938 A1    Oct. 9, 2014

(30) Foreign Application Priority Data
Oct. 27, 2011   (IT) .............................. RM2011A0563

(51) Int. Cl.
*F16D 3/30* (2006.01)
*B64C 27/41* (2006.01)

(52) U.S. Cl.
CPC . *F16D 3/30* (2013.01); *B64C 27/41* (2013.01); *Y10S 464/905* (2013.01)

(58) Field of Classification Search
CPC ....... F16D 3/30; B64C 27/41; Y10S 464/904; Y10S 464/905

USPC ......... 464/106, 112, 125, 126, 136, 904, 905; 244/60

See application file for complete search history.

(56) References Cited

U.S. PATENT DOCUMENTS

| 1,899,170 | A | * | 2/1933 | Wainwright | .................. 464/125 |
| 3,263,447 | A | | 8/1966 | Baker | |
| 7,144,326 | B2 | | 12/2006 | Thompson | |

FOREIGN PATENT DOCUMENTS

| EP | 0 361 745 A1 | * | 4/1990 | .................... 464/125 |
| FR | 2227175 A1 | | 11/1974 | |
| GB | 2016396 A | | 9/1979 | |

OTHER PUBLICATIONS

International Search Report for corresponding International Application No. PCT/IT2012/000322.

* cited by examiner

*Primary Examiner* — Gregory Binda
(74) *Attorney, Agent, or Firm* — Egbert Law Offices, PLLC

(57) ABSTRACT

A constant velocity universal joint for helicopters with gimballed rotors, in which the hub of a rotor is supported on a transmission shaft by means of a cardan's suspension composed of a first inner ring with a revolute connection to two opposite pins of the carrier connected to transmission shaft and a second outer ring with a revolute connection to two opposite pins of the hub. The rings are also interconnected by swivel opposite pins, in quadrature with respect to the pins connected to the transmission shaft and to the pins of the hub, whose common axis is stably maintained in a plane, which bisects the angle between the axes of rotation of the hub and the transmission shaft, by at least one device, which is connected to the transmission shaft and to the hub, thus obtaining a homokinetic transmission of rotational motion between the transmission shaft and the hub.

2 Claims, 11 Drawing Sheets

CONSTANT VELOCITY UNIVERSAL JOINT FOR HELICOPTER ROTOR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a constant velocity universal joint for any type of transmission and in particular for helicopters with so called "gimballed" rotors, intended to find use in the three blades or in general multiblade main rotors of helicopters, as well as in two-blade main rotors for helicopters also equipped with stabilizer bar aerodynamics.

2. Description of Related Art Including Information Disclosed Under 37 CFR 1.97 and 37 CFR 1.98.

As it is known, in helicopters, the control of the direction of motion of translation occurs by means of the inclination of the plane of rotation of the disk, defined by the circular path of the blades, with respect to the driving shaft constrained to the structure of the helicopter.

In helicopters with three or more blades normally rotors called "articulated" are employed, whose blades are bound to the rotor shaft with horizontal hinges, called hinges of flapping, eccentric with respect to the axis of rotation, to allow the motion of flapping, and with vertical hinges (drag hinges), the latter being suitably equipped with friction or provided with viscous devices which act on the plane of the disk to damp oscillations caused by Coriolis accelerations, which affect the blades when the rotor disk is inclined and the flapping motion is present.

Hinges aligned with the longitudinal axis of the blades are also present, at the root of each blade, designed to permit variations induced by the swash plate in the pitch of each blade, by the cyclic and collective pitch commands. In this type of rotors, thanks to the eccentricity of the hinges of flapping hinges and to the centrifugal force of the blades, the inclination of the plane of the disk exerts a favorable moment of control on the driving shaft (generally called "mast"), independent from the lift exerted by the rotor itself and which tends to maintain the same mast normal to the plane of rotation of the blades.

A variant of the articulated rotors is constituted by so-called "hingeless" rotors, in which the hinges are replaced by flexible elements which behave as virtual hinges, also being eccentric. In these types of rotor, such as in the articulated ones, the control of the inclination of the plane of the disk is realized by means of the cyclic oscillating motion of the blades around the pitches hinges, implemented by the swash plate.

There are also two-bladed rotors whose hub is hinged on the top of the driving shaft with a cylindrical hinge perpendicular to the axis of the blades, and to the axis of the mast, functioning as suspension hinge (called "teetering") which provides flapping motion of the blades and allows the inclination of the rotor disc. In the latter type of rotor, also known as suspended rotor ("seesaw"), it is required that the cylindrical hinge connecting the hub to the shaft lies in a higher position with respect to the attack of the blades, practically on the plane defined from the centers of gravity of the hub and of the blades, inclined upwards due to the lift, in order to cancel the vibrations that would be created for the cyclic displacement of the center of gravity of the rotor relative to the axis of rotation caused by tilting of the rotor disc. The blades, in fact, subject to the centrifugal force due to the rotation, and to lift force, assume an equilibrium position facing upward, so as to set a conical aspect of the disc, with consequent raising of the center of mass of the rotor. The variation of taper angle of the blades, due to different dynamic conditions and to the variability of the weight on board the helicopter, however, makes it impossible to completely eliminate this source of vibrations in all flight conditions and weight of the helicopter.

Furthermore, in this type of rotor, there is another source of vibration which originates from the geometry of the simple gimbal central hinge of flapping that, not being homokinetic, induces torsional oscillating stresses, with a frequency of two per revolution, on the driving shaft; those stresses are translated, thanks to the constraints existing between the transmission and the structure, in bothersome vibrations which propagate to the whole cell of the helicopter and the intensity of which is greater the more the rotor disc is tilted with respect to the shaft.

This type of rotor, moreover, due to the presence of the central hinge of flapping, applies no control moment on the transmission shaft; for this reason, in the flight conditions at low g (n<1 g) or zero-g, it is possible to lose control of the plane of the rotor disc. Even in this type of rotors, the control of the inclination of the disk is realized by means of the oscillating motion of the blades implemented by the swash plate around the pitch hinges.

All types of rotor above described are characterized by considerable stresses on the pitch hinges binding the blades to the hub, countering the centrifugal force; the stresses are caused by the reciprocating motion around the axis of pitch hinges, the motion being due to the action of the cyclic swashplate action on blades pitch to keep the rotor disc inclined.

To obviate the above mentioned drawbacks various systems have been proposed and disclosed. During the development of laminated elastomeric bearings in the past decades (U.S. Pat. No. 2,481,750 and U.S. Pat. No. 2,900,182), the types of elastomeric bearings that were later applied to the rotors of helicopters (USAAMRDL-TR-75-39B), have been disclosed: axial cylindrical bearings, cylindrical bearings, radial ball bearings and tapered roller bearings. Many of these types of bearings are at the basis of important refinements to the pitch hinges (U.S. Pat. No. 3,111,172 and U.S. Pat. No. 3,652,185) to reduce, but not eliminate, the friction and the consequent efforts on the commands caused by the use of the traditional rolling bearings in the pitch, with also considerable advantages for their durability.

Furthermore, in the field of two-bladed rotors hung with central hinge of flapping, U.S. Pat. No. 4,115,031, by Textron, has disclosed a method to allow the installation of a return spring on the hub (called "Hub spring") of the rotors suspended around the flapping hinge, in order to obtain a moment of control of the rotor with respect to the driving shaft and the helicopter, to overcome the drawbacks of loss of control in flight to zero-g, by absorbing the consequent the two-per revolution vibrations induced by return spring, by means of the flexibility of the blades in the plane of rotation, tuning the characteristic frequency of oscillation in that plane. However, that solution has not eliminated the torsional oscillation on the mast caused by the geometry of the semi-cardanic transmission of the rotary motion to the rotor.

Moreover, in order to reduce the amplitude of the alternate oscillations on the pitch hinges, caused by the cyclic control, oscillations that occur in conventional rotors described, and in order to eliminate the Coriolis accelerations and then the lag hinges in the rotors with 3 or more blades, some types of rotor so called "gimballed" or also called "floating-hub" have been developed. In these rotors, the central hub is supported on the top of its driving shaft by means of a spherical hinge, or with other kinematically equivalent devices, which allow an inclination of the hub with two degrees of freedom and therefore allow the hub to be always parallel to the plane of rotation of the blades (so called "tip path plane" or TPP), even though they are tilted. The floating-hub rotors have proved themselves to be suitable to be equipped, together with appropriate devices, to create a resilient biasing between hub and shaft, making the behavior of these rotors quite similar to the articulated rotors in flight conditions at low or zero g.

This type of rotor hubs were initially used in aircraft in which the power was transmitted to the blades by means of jets of gas emitted by suitable nozzles located at the end of the blades themselves (system called "Tip Jet" or "Tip driven"). In that type of power transmission the need of the homokinetic transmission of motion from the driving shaft to the hub of the rotor was not requested.

Later on, in some aircrafts (helicopters and convertiplanes), in which the motion of rotation of the blades and the drive torque is transmitted from the driving shaft to the hub, various systems have been developed aimed at eliminating the torsional oscillations on the mast and various solutions have been proposed to achieve constant velocity joints suitable for this type of floating hub rotors. The central spherical hinge, normally made of elastomeric laminates spherical bearings of known type (e.g. U.S. Pat. No. 3,941,433), is equipped with appropriate stiffness so that the rotor disc, when it is tilted, exerts a favorable control moment on the shaft of the rotor, with a behavior similar to articulated rotors fitted with eccentric flapping hinges. A model of this type of rotor has been disclosed by the U.S. Pat. No. 4,729,753 in which the hub of the rotor, suspended spherical by means of two opposed laminated elastomeric bearings on the no transmission shaft, is maintained in rotation by means of suitable elastomeric elements that realize a substantially homokinetic joint.

Many of such solutions have been proposed in view of applications of hybrid rotors (called "tilt rotors") applicable to convertiplanes. The complexity of these systems has limited their employment opportunities and has prevented the spread in commercial helicopters. In the field of us the rotors with complex mechanical, other authors have disclosed different types of rotary connections (called "link-type rotary coupling", see U.S. Pat. No. 4,804,352) for three-bladed rotors, in order to obtain a spherical suspension of the rotor and a quasi-homokinetic motion transmission.

Also in other fields of application, some types of constant velocity joints have been proposed, consisting of several assembled elastomeric devices, that allow to transmit the rotary motion with a drive torque between two rotating inclined shafts. An example of these devices has been released by U.S. Pat. No. 4,208,889. In general, the homokinetic cardanic rotors are characterized, so far, by a considerable constructional complexity and their assembly involves the coupling of a very large number of components. The aforementioned elastomeric devices, moreover, do not always guarantee the homokinetic transmission of motion between the shaft and the rotor hub to an acceptable level because of resilient materials which many of the components are made.

BRIEF SUMMARY OF THE INVENTION

The present invention, has got as its basic purpose to obviate the aforesaid drawbacks encountered in the two-bladed rotors for helicopters, and three bladed and generally multi-blade rotors, by designing an improved homokinetic cardan rotor head with floating hub in which the homokinetic transmission of the rotational motion and the driving torque is obtained by means of rigid and non-resilient elements, applicable to the above mentioned two-bladed rotors, three blades and multiblade in general. It includes means for connecting the blades to the driving shaft (called "mast"), a hub, connected to that driving shaft by means of two concentric cardanic rings housed inside a cavity of the hub itself, on which yokes are also present; in the yokes the blades are fixed by means of horizontal eccentric hinges of known type and commonly called "taper", capable of maintaining the blades in rotation and to transmit the aerodynamic forces produced by the blades in rotation, to the transmission shaft and to the helicopter.

Outside the two concentric rings and acting on the opposite pins which couple the two rings, there is at least one original and improved device, below called "bisector", and preferably there are two bisectors composed as follows: a first element connected to the transmission shaft by a connecting rod and a second element connected to the rotor hub by another connecting rod. Both the connecting rods, in the shape of forks, equal and symmetrically arranged between them, act on the two bisectors coupled together in prismatic and revolute way, sliding on the cylindrical end that is projecting from one of the two pins that couple the cardan concentric rings as in a rhombic drive mechanism, with the common axis of the above pins in one plane, called homokinetic, which bisects the angle of inclination between the plane of rotation of the hub and the plane of rotation of the transmission shaft. Since the two pins are mutually bounded by the same concentric rings to be coaxial, one bisector is able to ensure that the common axis of the two pins is in the homokinetic plane and then it is able to adjust the operation of the constant-velocity universal joint.

The invention, in its embodiments, also provide for the presence of preferably two opposing bisectors, being two the pins which couple the concentric rings, in redundancy function both to distribute the efforts, and to ensure that the smooth operation of the coupling continues even after a rupture of one of the two bisectors. In this case both the pins which couple the two cardan rings, present a protruding cylindrical end on which the two bisectors slide. It is evident from the drawings that come with the description of the three preferred embodiments, that the two bisectors operate in a completely independent way from each other and are kinematically equivalent. It is stressed, moreover, that the bisector are subject to efforts to maintain the plane homokinetic, the efforts being variables during the rotation and the maximum value of which depends on the torque applied and on the angle of inclination between driving shaft and driven shaft. The presence of two bisectors is used to divide symmetrically these efforts of two separate joints connected to different bearings located on the transmission shaft and on the hub with the advantage of greater robustness of the system as a whole. Not least, one has to consider the balance of the rotating masses: the presence of two opposing bisectors makes the joint more balanced.

In the past, several constant velocity joints (CVJ) have been proposed and disclosed, based on the concentricity of two universal joints obtained by shortening, up to eliminate the intermediate shaft of the classic "universal joint", that usually consists of two universal joints (or Hooke's) at the end of an intermediate shaft: U.S. Pat. No. 1,058,878 (Lowndes, 1913), U.S. Pat. No. 1,562,080 (Chilton), U.S. Pat. No. 1,621,667, (Hayes) U.S. Pat. No. 5,954,586 (Kirson), U.S. Pat. No. 7,144,326 (Thompson); the difference between the solutions proposed and disclosed, is in the various devices proposed for obtaining homokinetic plane and then to make constant the speed transmitted to the driven shaft.

The invention herein claimed relates to a constant velocity universal joint consisting of two concentric cardan rings provided with one or more bisector devices that specifically fit to the typical geometry of a hub of a helicopter rotor (which is in this case "the driven shaft of the coupling") and of the mast (that assumes the function of "driving shaft" and that supports and actuates the hub), and effectively ensure the maintenance of the constant velocity plane by the pins common to the two concentric Cardan rings. Advantageously, this system has a high flexibility and adaptability, it requires a simple maintenance being able to be composed of elements that do not require periodic lubrication, and ensures a safe use, effective in operation. Another primary purpose of the invention is to make possible the realization of Cardan rotors, called "gimballed" or floating hub rotors, for two-bladed helicopters, three blades and multiblade rotors in general, in which the transmission of motion between the transmission shaft and the hub of the rotor takes place through a system of mechanical members that realize a constant-velocity universal joint and in which it is possible the installation of devices of known type adapted to provide an elastic return (called "hub springs") between the hub and the shaft, intended to increase the control authority of the rotor on the helicopter and to prevent the phenomenon of loss of control in flight in low-g or zero-g.

Another aim of the present invention is to provide a constant velocity cardan rotor head for two-bladed helicopters that can be equipped with an improved device of inertial and aerodynamic stabilization, of the type called "Bell-Hiller flybars", consisting of two small aerodynamic surfaces, fixed with the hub and in quadrature with the blades, the hub being able to tilt with respect to the driving shaft, both on the flapping axis, and on the blade pitch axis (called "feathering axis"), aerodynamically controlled by the streamlined bar (called "fly-bar"), and being kept in rotation at a constant speed, regardless of the angle of inclination of the rotor itself with respect to the driving shaft, by means of a pair of concentric cardan rings housed in a special cavity of the hub. The outer ring is connected with the hub of the rotor, while the inner ring is connected to the driving shaft and through at least one or two bisector devices, identical and opposite, also connected to the driving shaft and to the hub (driven shaft), suited to maintain the axis of the pin common to the two concentric crosses on a plane, called homokinetic, which bisects the angle assumed by the hub with respect to the transmission shaft, ensuring a motion always constant to the hub.

A further object of the invention is to provide homokinetic two-bladed and three-bladed floating hub rotors in which the amplitude of the oscillating relative motion of the blades around the pitch bearings, that occurs in traditional rotors and caused by the cyclic control of pitch of the blades operated by the swash plate, is almost nonexistent or at least reduced compared to the other helicopter rotors, because the hub is able to tilt also around the pitch axis ("feathering axis") controlled by an aerodynamic bar ("Fly-bar").

Another object of the invention is to eliminate the torsional oscillations on the transmission shaft connected to the rotor that are encountered in helicopter rotors due to the flapping motion of the blades around eccentric hinges, in the rotors called "articulated", and around the only central flapping hinge in the two-bladed rotors called "teetering."

Another object of the present invention is to realize a cardan "gimballed" rotor head or a floating hub one, with three or more blades connected to the driving shaft with an improved constant-velocity universal joint, in which the rotor hub constitutes the driven element of the coupling, composed of a limited number of components, and characterized by the fact of being devoid of lag hinges and lag shock absorbers, the blades not being subject to the Coriolis accelerations.

A further object of the invention is to provide an improved double cardanic concentric system which finds its use in the production of constant velocity joints (also called "universal") for general use. Advantageously, in fact, the invention, devoid of the helicopter blades, is also usable as an universal joint in all applications in which it is generically intended to transmit the rotary motion and a driving torque between two inclined shafts so that the driven shaft speed is always equal to the speed of the driving shaft.

It is therefore object of the present invention a constant velocity universal joint for each type of transmission and in particular to operate the rotor blades of helicopters by means of a hub of the rotor, on which the blades themselves are bound, and that constitutes the driven shaft of the joint, connected with appropriate mechanical members to a driving shaft (called "mast") of the helicopter, for maintaining the hub in rotation, with the blades connected to it, at constant speed about an axis inclined with respect to the axis of rotation of the driving shaft, the joint comprising the following mechanical members:

a couple of cardanic concentric rings, a first ring or internal cardanic ring coupled in a revolute way to the carrier, integral with the mast, by means of two rotating, and a second ring or external cardanic ring coupled in a revolute way to the rotor hub, by means of two swivel pins, said two cardanic rings being connected among each other by two connection pins in order to allow the relative rotation of the external universal ring with respect to the internal cardanic ring, substantially in quadrature with the pins of the mast rotor, the center of said concentric rings resulting coincident with the intersection 250 between the axis of rotation of transmission shaft and the axis of rotation of the hub or of the driven shaft;

at least one alignment device said "bisector", preferably two bisectors, to maintain the common axis of the pins connecting the two cardanic rings in a plane called "homokinetic", whose normal bisects the angle formed between the axis of rotation of the hub, or rotor driven shaft, and the axis of transmission shaft.

In particular, when there are two bisectors, said bisectors cooperate with each other, although they are independent in their operation from each other, and operate on the pins which couple the two cardan concentric rings forming a double rhombic 260 guide, being anchored, separately, with suitable joints, to the driving shaft and to the hub or rotor driven shaft.

Preferably, according to the invention, said constant velocity joint, in its intended application for a rotor of a helicopter, further comprises:

a sleeve (called "carrier"), fitted with grooved profile on the mast, provided with two opposite and protruding pins, on which the cardanic internal ring is centered, with rotary coupling;

in executions for helicopter rotor the sleeve prevents the positioning of said pins directly on the transmission shaft. Said sleeve has, furthermore, at least one support (or two opposing supports) that allows connection of a bisector (or two bisectors) on the transmission shaft. The interior cardanic ring is provided with two annular seats on which commercial-type flanged antifriction bushes are housed, equipped with a sliding surface with PTFE, which couple with low friction, and without lubricant, to the two protruding pins of said sleeve. Said inner ring (which, for mounting needs in the helicopter rotor, is preferably provided and composed of various bolted elements) is provided with a further two annular seats, inquadrature with respect to the first ones, for the housing of antifriction bushings, similar to the previous ones, within which are housed, with revolute coupling, two pins integral to the outer ring. At least one of said pins (or both) has a cylindrical extension projecting outwardly of the outer ring, on one of which (or both), a bisector is housed with sliding and revolute coupling (in case both pins are protruding two bisectors can be housed). The outer ring, in quadrature with respect to the pins, is provided with two opposing slots for two further flanged antifriction bushings in which are housed, with revolute coupling, a pair of opposite pins integral with the hub and radially arranged;

two semi-spherical annular hinges and vertically opposed with respect to the center of the rotor, each being divided into two or more elements for enable mounting, being provided that said half-hinges consist of spherical laminated elastomeric bearings with rigidity, or opposed spherical surfaces, sliding to each other by an interposed layer of antifriction material; in the first case the stiffness of the elastomeric elements constitutes a return spring (called "hub spring") between the rotor hub and the transmission shaft, that ensures the control of the rotor also during the flight to low or zero-g; in the second case, not being exerted by the central spherical hinge any action of elastic return between hub and shaft, the possible return spring between hub and shaft can be realized with an elastomeric element housed in a suitable seat formed in the bottom part of the hub itself. These semi-hemispherical opposing hinges have their center coincident with the center of the constant velocity joint; the latter is able, due to the described constraints in the two concentric cardanic rings, to carry out by itself the function of the spherical joint for supporting the hub of the "gimballed" rotor: said hemispherical bearings, in both described configurations, are therefore provided solely with the function of releasing from the constant velocity joint and the connecting pins, the stresses due to the axial load arising from the lift of the rotor and by the inertia of the helicopter. The cardanic rings and the connecting pins, in that way, are only interested by the stresses resulting from the transmission of the torque.

a transmission shaft, provided with a shoulder ring on which the axial forces of the rotor apply, transmitted from said semi-spherical opposing hinges that are able to transmit torque to the hub and blades, through the shrink fit of the sleeve, on which are mounted concentric cardan rings that form the constant-velocity joint; the rotor hub, designed for the mounting of the blades into appropriate yokes, and provided with a central cavity for the housing of concentric cardanic rings by means of two opposite pins integral with the hub and on which the outer ring is centered, and provided, on the top and bottom side, with housings for the described semi-spherical hinges on the transmission shaft; said hub being also provided, on the top of the central cavity, of one (or two) opposite housings for connecting pins of the rods connected to the bisector (or to the two bisectors) of the constant velocity joint.

The object of the present invention is also a rotor comprising said constant velocity joint.

BRIEF DESCRIPTION OF THE DRAWINGS

The present invention is illustrated and described in the following, for illustrative but not limitative example, in three preferred embodiments.

FIG. 1 is a partial isometric view of a three-bladed rotor with floating hub, with parts of the rotor partially removed in order to make the driving devices of the constant velocity joint with two bisectors visible; in FIG. 1 is also represented the Axis 00 of the common pins of concentric cardanic rings, the axis lying on the homokinetic plane;

FIG. 2 is an enlarged detail of the rotor of FIG. 1 deprived of blades;

FIG. 3 is a detail of the cardanic rings, of the sleeve and of the bisector of the constant velocity joint object of the invention;

FIG. 4 is a detail of the carrier or sleeve.

FIG. 5 shows a partially exploded view of the support, drag-and stiffness devices of the rotor with respect to transmission shaft;

FIG. 6 shows the exploded view of the components that constitute the constant velocity joint and the carrier;

FIG. 7 is a sectional view of the support, drag devices of the rotor and in particular of the joint object of the invention with two bisectors, tilted by 10 degrees with respect to the transmission shaft.

FIG. 9 shows an isometric view of the constant velocity joint provided with two bisectors, where transmission shaft and driven shaft are inclined to each other;

FIG. 10 shows a partially exploded view of the constant velocity joint of FIG. 6, and in particular of the elements that make up the bisector and the two rods connecting the bisector respectively to the transmission shaft and to the driven shaft;

FIG. 11 shows a sectional view of the constant velocity joint of FIG. 9 and the related devices of homokinetic dragging;

FIG. 12 shows the constant velocity joint devoid of bisectors in which the revolute action of the pin with respect to the interior ring is underlined.

DETAILED DESCRIPTION OF THE INVENTION

1) First execution: CV joint for helicopter rotors.

Figure 1:
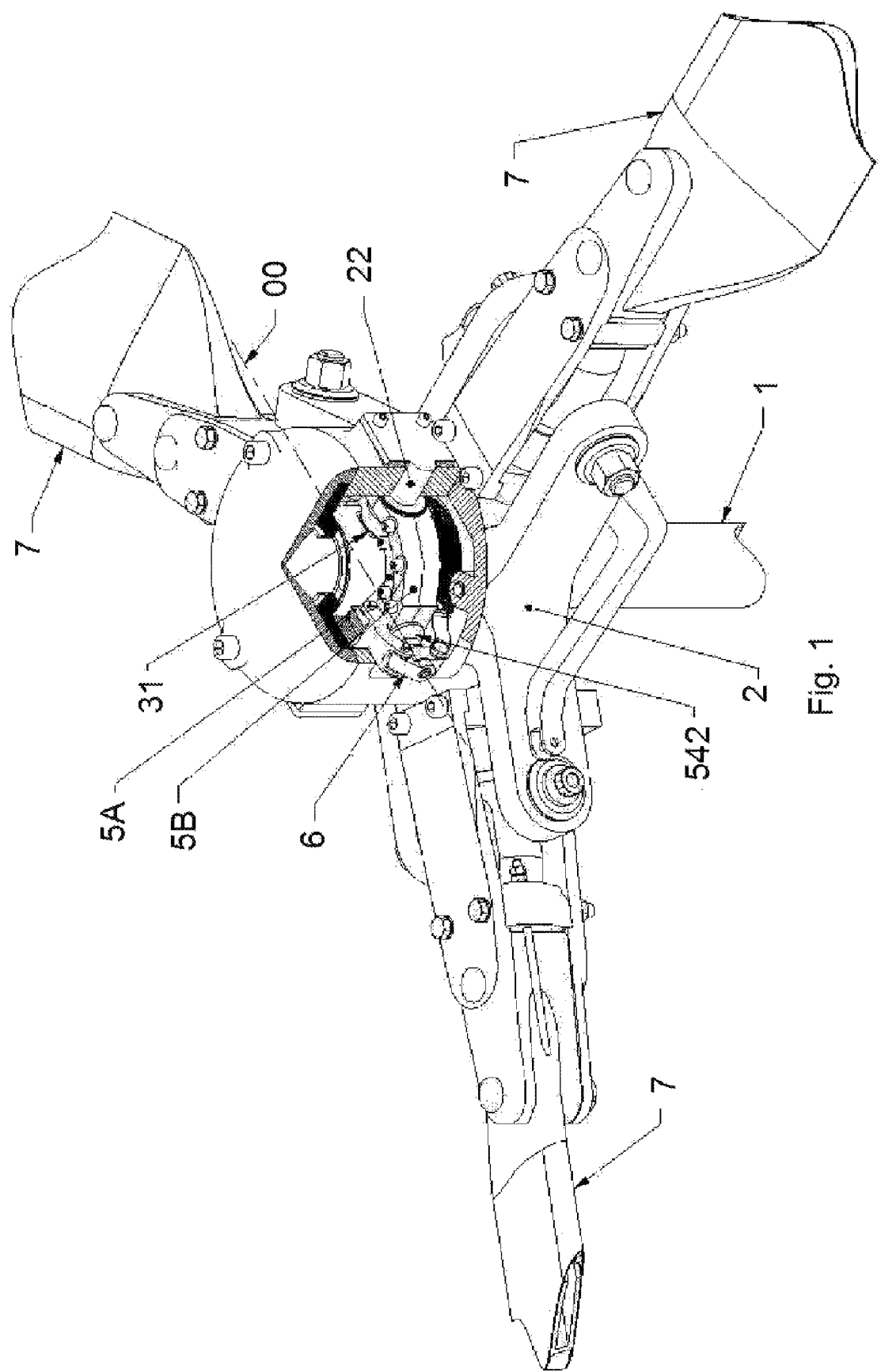
In FIGS. 1, 2, 3, 4, 5, 6, 7 a first implementation of the invention applied to a helicopter rotors presented, and in particular.
Figure 2:
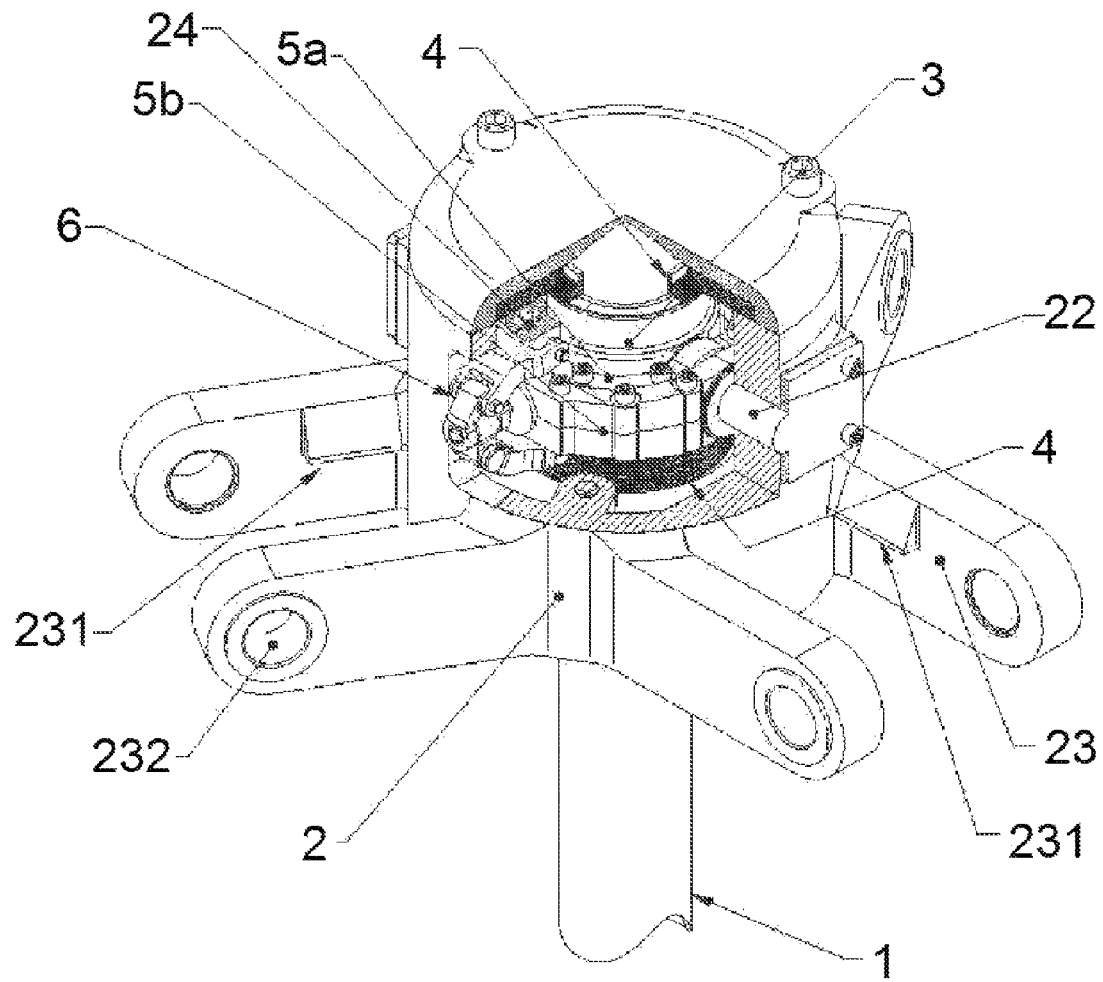
Figure 3:
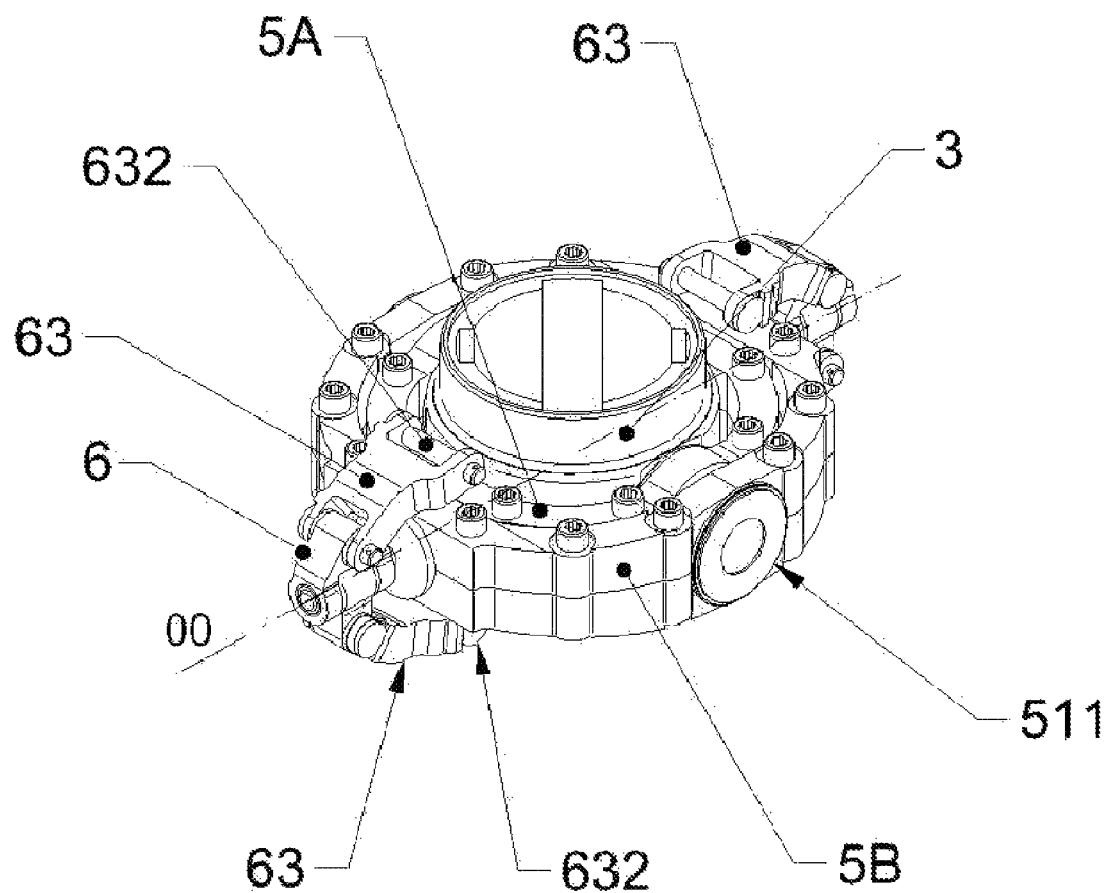
Figure 4:
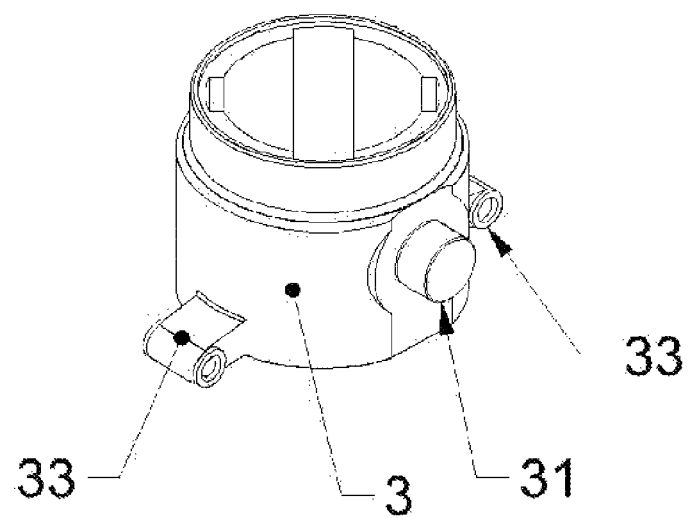
Figure 5:
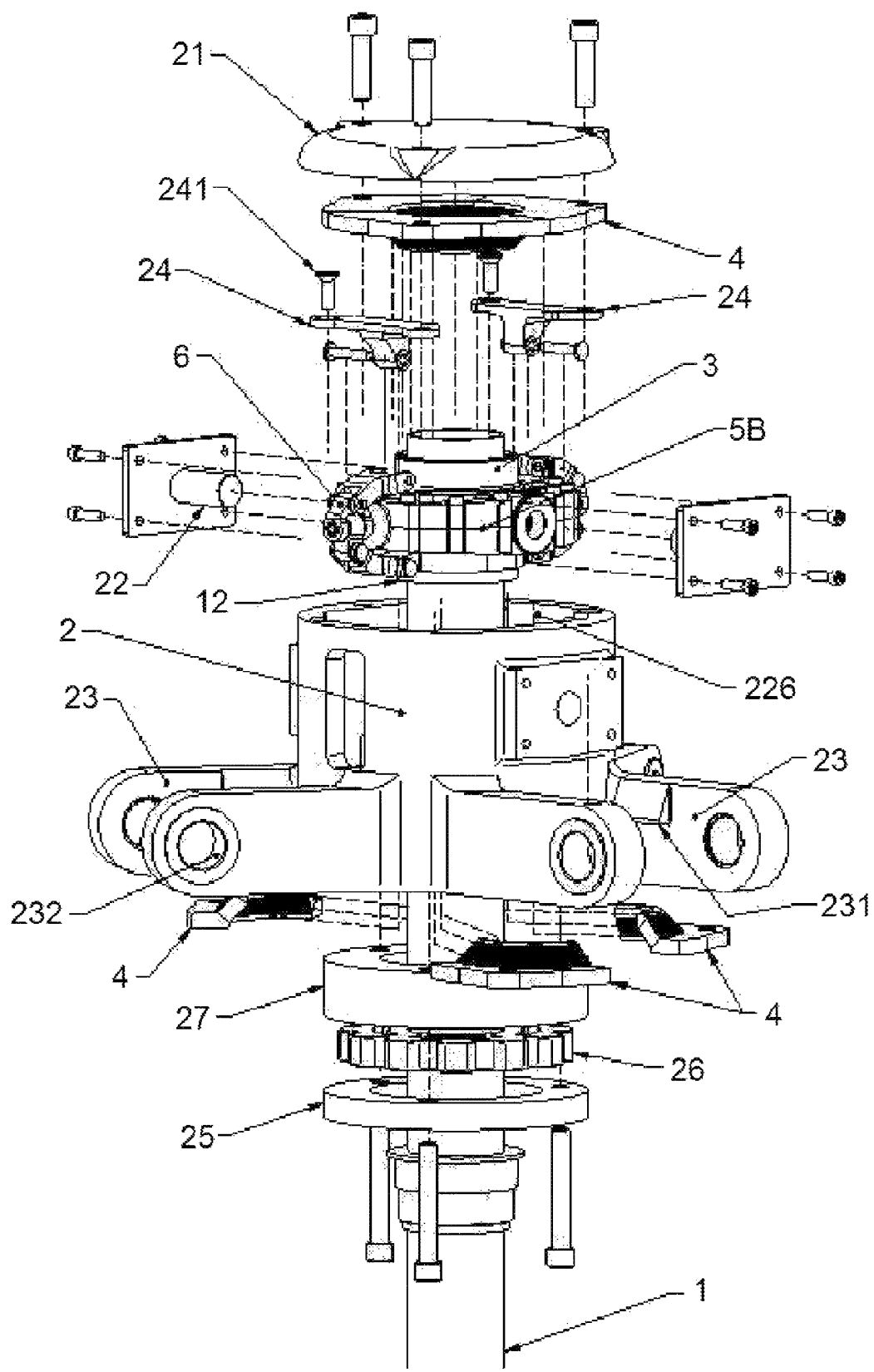

With reference to FIGS. 1, 2, 3, 4, 5, 6, 7 a three-bladed floating hub rotor is presented. The transmission shaft 1 (or driving shaft) is provided with a sleeve 3 (called "carrier"), internally grooved to be keyed on protruding teeth 11 of the driving shaft; said sleeve 3 is provided with two opposite and projecting pins 31, on which the inner cardanic ring is pivoted, with rotary coupling. The transmission shaft 1 supports the hub 2 of the rotor (or driven shaft), equipped with the yokes 23 (FIG. 2) for accommodating the blades 7, with hemispherical hinges 4, which reflect on the shoulder ring 12 (FIG. 6) of the shaft 1 and on the sleeve 3, being said hinges 4 bolted on said hub 2 on the appropriate opposite seats (FIG. 5). The hemispherical hinges 4 (FIG. 5) are made with bearings of known type and fall into the category of spherical elastomeric laminates bearings (Type III—Ref USAAM-RDL-TR-75-39B).

The constant velocity universal joint comprises a pair of cardanic rings (FIG. 3 and FIG. 9) 5A; 5A', 5B; 5B', concentric: a first ring, or internal cardanic ring 5A; 5A' revolute coupled to the driving shaft 1 by two swivel pins 31, and a second ring or external cardanic ring 5B; 5B' revolute coupled to the hub 2 of the rotor by means of two swivel pins 22. These two cardanic rings are connected to each other by means of two connection pins 542 shaped to allow the relative rotation of said external cardanic ring 5B; 5B' with respect to internal cardanic ring 5A 5A', substantially in quadrature with the pins 31, 31' of the driving shaft 1 and with the pins 22 of the hub 2 of the rotor or driven shaft 2'. In particular, each of said connecting pins 542 has a projecting end 5421 that is coaxial with the connecting pin itself.

The pair of cardanic rings 5A and 5B of the first and second execution for a helicopter rotor, may be preferably constituted by assembled elements. On the two pins 31 (only one of which is visible in FIG. 6) belonging to the sleeve 3 (FIG. 6), the inner cardanic ring 5A is mounted. Said inner ring 5A is represented as a bolted whole (FIG. 6), comprising an upper element 5A1, two elements 5A3, each of which provides an anti-friction bushing 541, to which the two elements 5A3 are bolted, and two additional elements 5A2, each of which provides a seat for housing an antifriction flanged bushing 32. The elements 5A3 and the further elements 5A2 are fixed to said upper element 5A1 by screws together constituting the internal cardanic ring 5A. The antifriction bushes 541 and antifriction flanged bushings 32 are revolute coupled respectively with the connection pins 542 and with the pins 31.

The outer cardanic ring 5B (FIG. 6) is composed of two elements fixed with screws between them, of which a first lower element 5B2 and a second upper element 5B1, both of substantially quadrangular shape. Each of said elements 5B2, 5B1 is equipped with two pairs of recesses for the formation of two seats, each for the stable housing of a pin 542 and two additional pairs of hollows for the formation of two seats, each one if them for accommodating an antifriction flanged bushing 511. On said antifriction bushings, by means of a rotary coupling, the pins 22 (FIGS. 1, 3 and 5) act, being integral with the hub 2 of the rotor.

Figure 6:
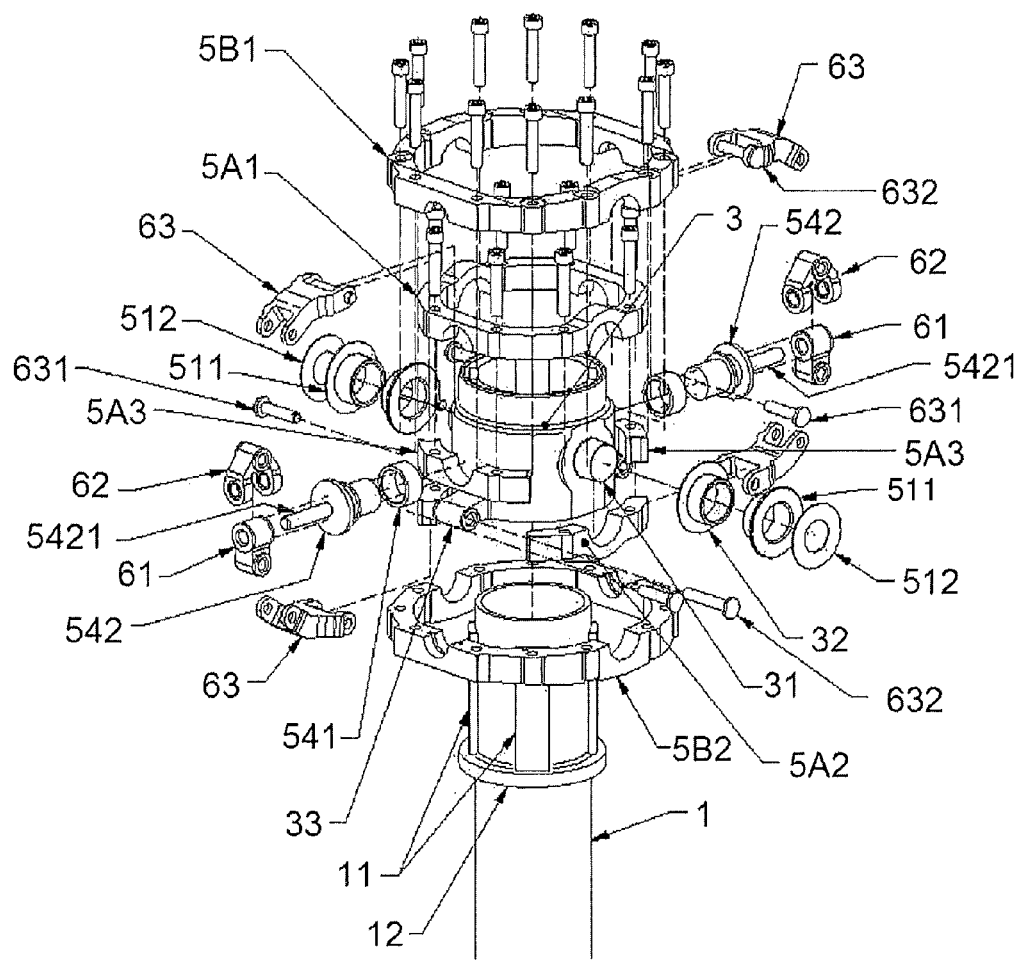
Figure 7:
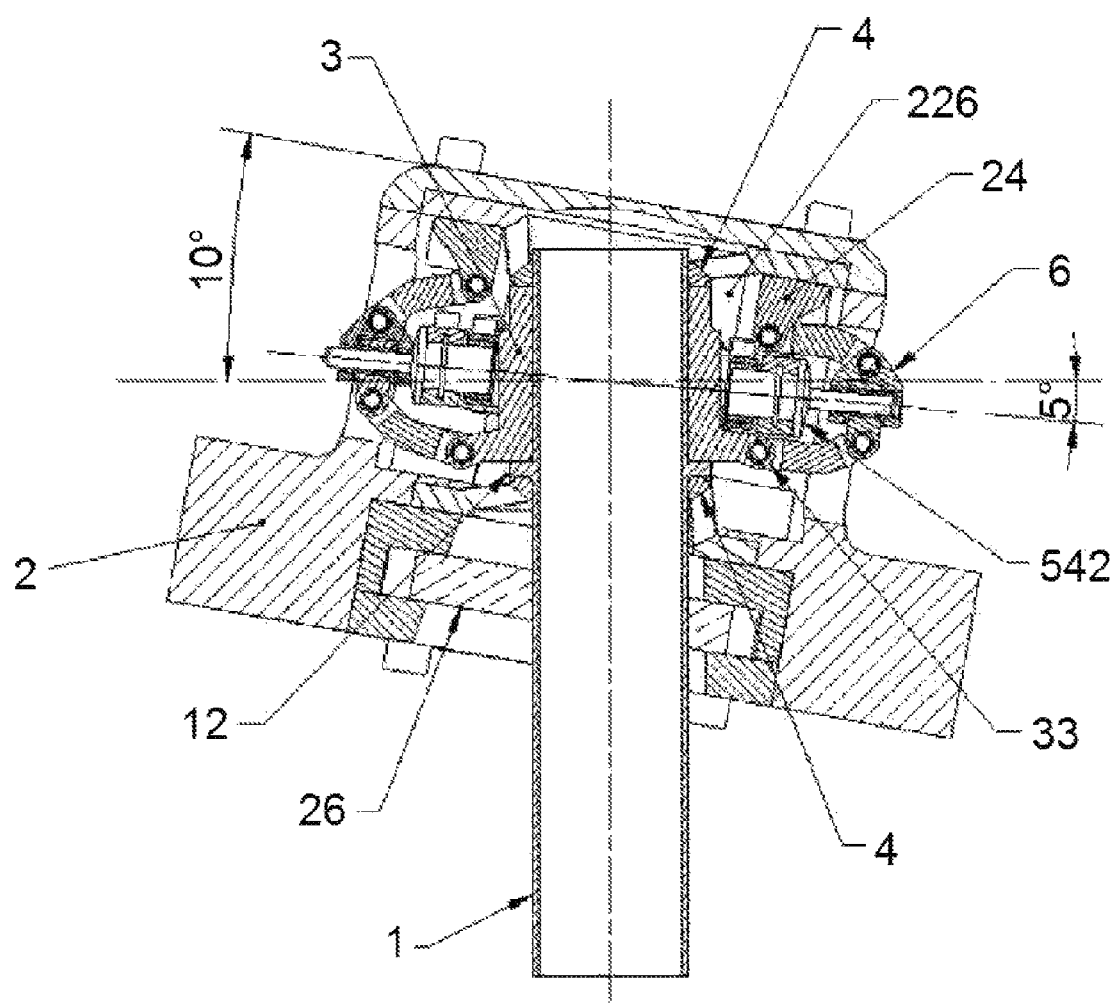

Between the antifriction bushings 511 and the hub 2 of the rotor there are the two calibrated shims 512, which allow the centering without clearance of the hub 2 with respect to the center of rotation of the driving shaft 1 and to the cardan rings 5A and 5B. On each projecting end 5421 of the connecting pins 542, which connect together the two concentric cardan rings (FIG. 6) a corresponding bisector device 6 (FIGS. 2 and 3) acts to keep the connecting pins on the common axis, indicated generically with 00, on a plane that bisects the angle between said transmission shaft 1 and the hub 2 of the rotor, plane called "homokinetic". In particular, each of said bisectors 6 comprises a first element 61 and a second element 62, respectively connected to the driving shaft 1 and the hub 2 by means of two rods 63 (FIG. 6).

The first element 61 is inserted prismatically in the second element 62, and both are sliding and rotary coupled to the protruding end 5421 of each connection pin 542. Each of said elements 61, 62 is provided with at least one trough hole to allow the passage of said projecting end 5421 in each of them. For this purpose, that is for the correct insertion of the protruding end 5421 connecting bolts in each of said two elements 61, 62, the through holes of these two elements must be aligned. In particular, the second element 62 has a shape of a "V" and in the vicinity of each free end is provided with a through hole, while the first element 61 is shaped so as to have a portion with a through hole, that portion being sized to be positioned in the second element 62 in a way that its through hole is aligned with the two through holes of the second element 62. In addition, each element 61, 62 is provided with an additional hole to allow to a respective connecting rod 63 to be fixed to a corresponding element through a pin. In other words, each connecting rod 63 is fixed on one side to one of said two elements 61, 62 of the bisector 6, and on the other side to the driving shaft 1 or to the hub 2 of the rotor so as to form a rhombic double guide.

In order to fix said connecting rods 63 to the driving shaft 1 and the hub 2 of the rotor first support means 33 are provided on the transmission shaft 1 and second supporting means 24 on the hub 2 of the rotor. Said first and second means of support 33, 24, through said connecting rods 63, transmit to each bisector 6 the mutual position between the hub 2 of the rotor and the transmission shaft 1.

In the example being described, each rod 63 is shaped to a more or less a form of "H" and is provided with a hole in the vicinity of each free end. In other words, each connecting rod is provided with a first and a second pair of holes to allow the passage of a respective pin which allows to fix said connecting rod to the first supporting means 33 provided on the transmission shaft 1 and the second supporting means 24 provided on the hub 2 of the rotor. Each pair of said elements 61 and 62 is connected via swivel pin 631 to a respective pair of connecting rods 63, which, in turn, are secured with further swivel pin 632, the lower one already connected to the element 61, to a seat 33 projecting from the sleeve 3 (FIGS. 4 and 6); the upper one, already connected to element 62, to a support 24 (FIGS. 5 and 7), the latter integral with the hub 2 by means of screws 241 (FIG. 5).

The seat 33 of the sleeve 3 and the support 24 are geometrically specular respect to the center of the constant velocity universal joint. With reference to the diameter of the sleeve 3, the bisectors 6 are in a diametrically opposite position. In particular one of the two bisector 6 plays an action of redundancy with respect to the other bisector being kinematically equivalent. FIG. 4 illustrates a section in quadrature of the hub of the rotor, where said hub is inclined by 10 degrees with respect to the driving shaft 1; the kinematics of dual rhombic drive of homokinetic joint provided with two bisectors is represented.

2) Second execution of the invention: constant-velocity universal joint provided with a single bisector.

Figure 8:
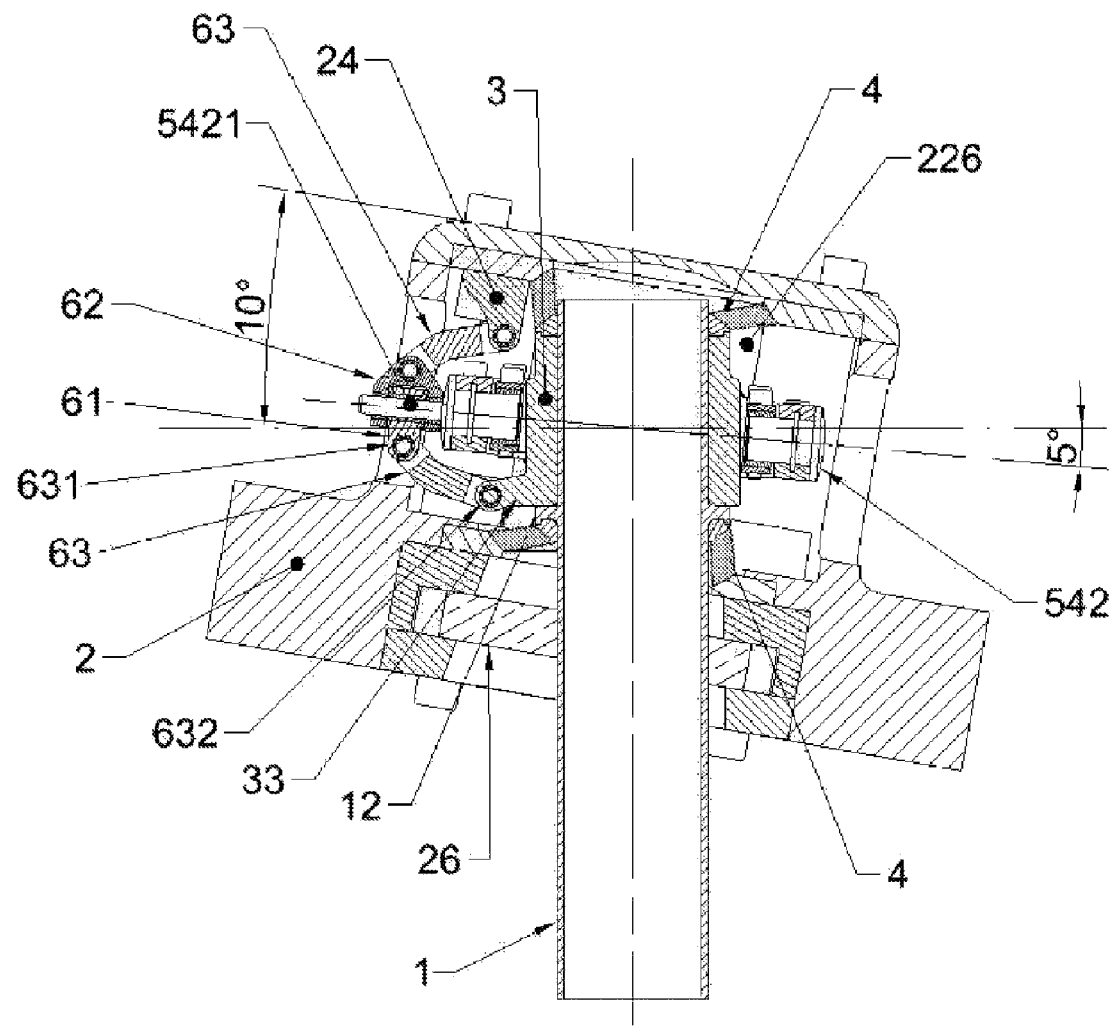
FIG. 8 is a sectional view of a second execution of the joint object of the invention, running with a single bisector, inclined by 10 degrees with respect to the transmission shaft.

In FIG. 8 the cardanic concentric rings and a single bisector 6 maintain the common axis 00 (axis of coupling between the internal cardanic ring and the external cardanic ring), represented by the two opposing pins 542, on a plane, said homokinetic, that bisects in 5 degrees the angle of inclination of 10 degrees of the plane of rotation of the hub 2 of the rotor with respect to the driving shaft 1, to guarantee the homokinetic transmission of rotational motion between said shaft transmission 1 and said hub 2.

3) Third execution of the invention: Constant velocity universal joint adaptable to any type of transmission.

Figure 9:
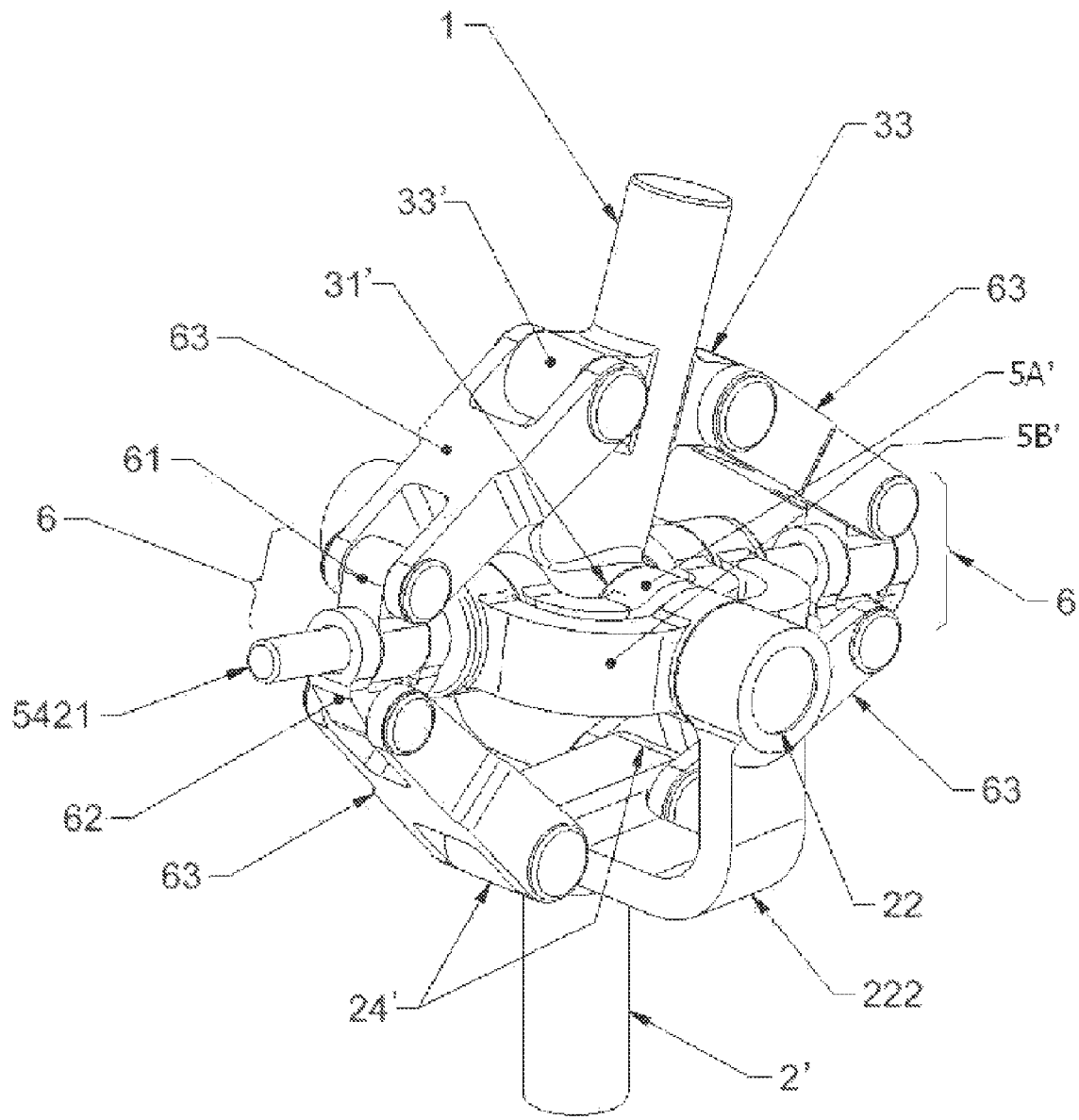
In FIGS. 9, 10, 11 and 12 a third execution of the invention is represented, which refers to a constant velocity universal joint intended for general use for each type of transmission, and in particular.
Figure 10:
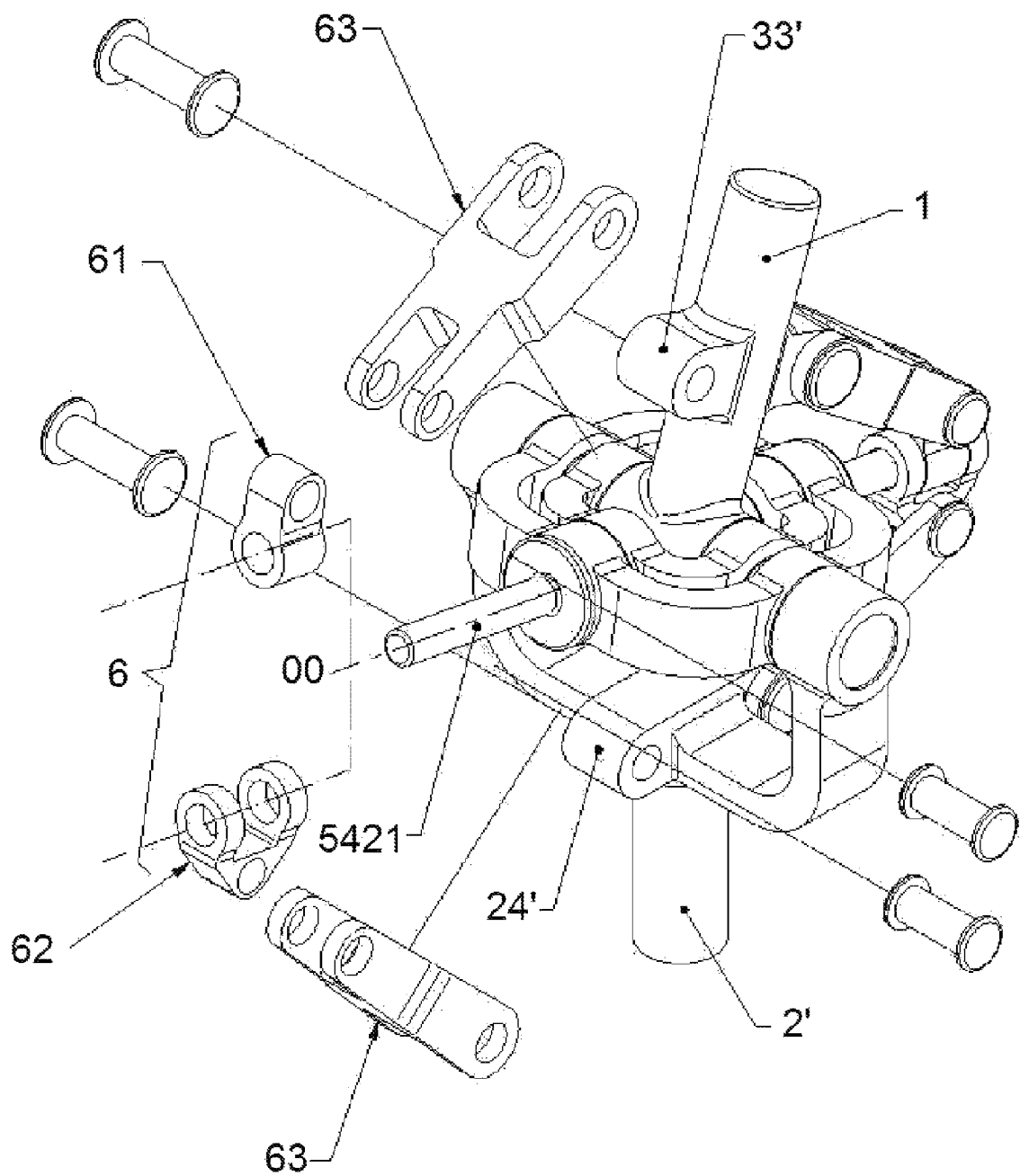
Figure 11:
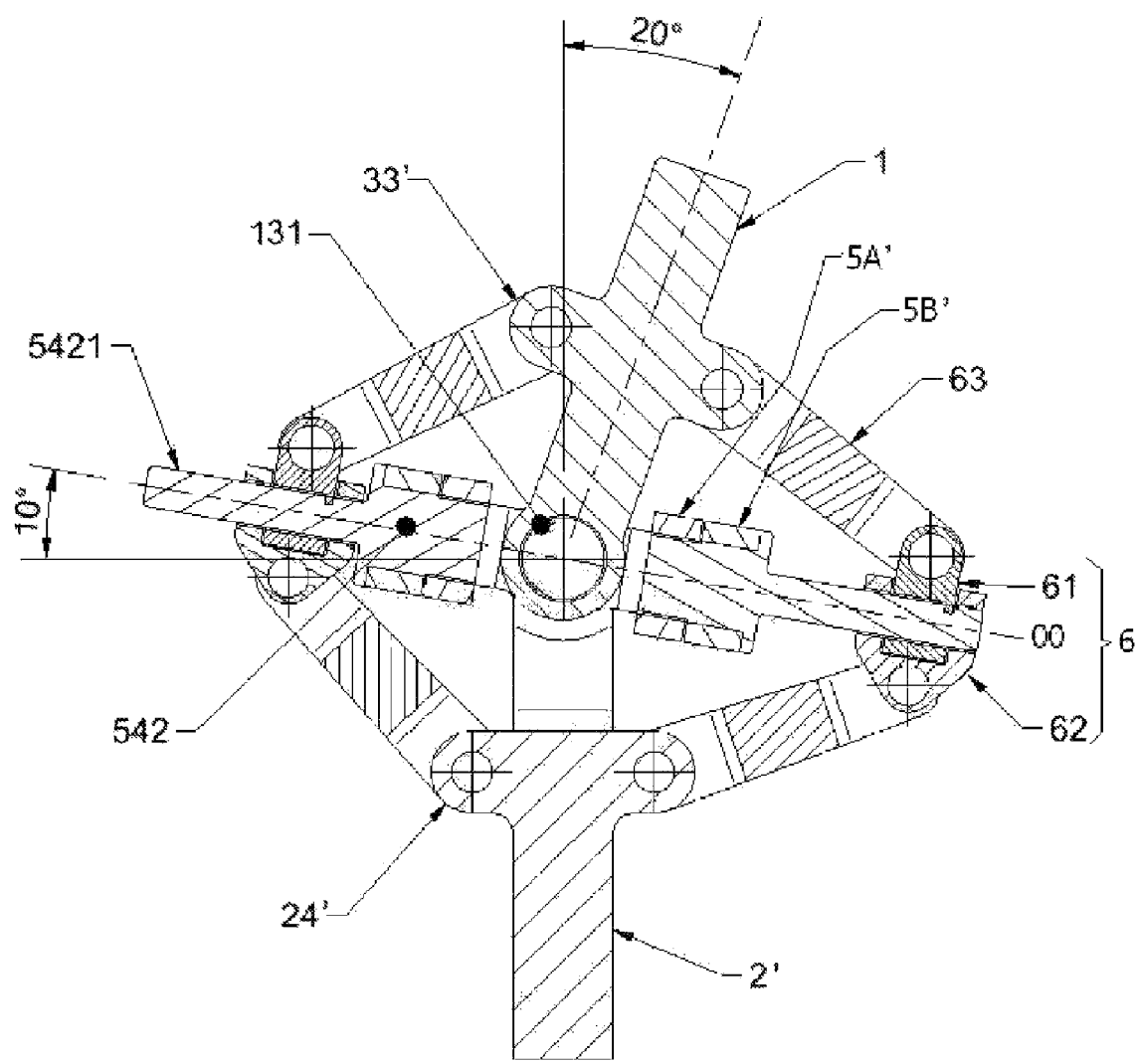

FIGS. 9, 10, 11 and 12 show a third implementation of the invention for universal use. With reference to FIGS. 9 and 11, the internal cardanic ring 5A' is pivoted with the pin 31' through the through hole 131 to the driving shaft 1 (FIG. 11), which has a projecting seat 33' for connection to the connecting rods 63; in this execution the inner cardanic ring is pivoted directly on the transmission shaft and not on the sleeve.

Figure 12:
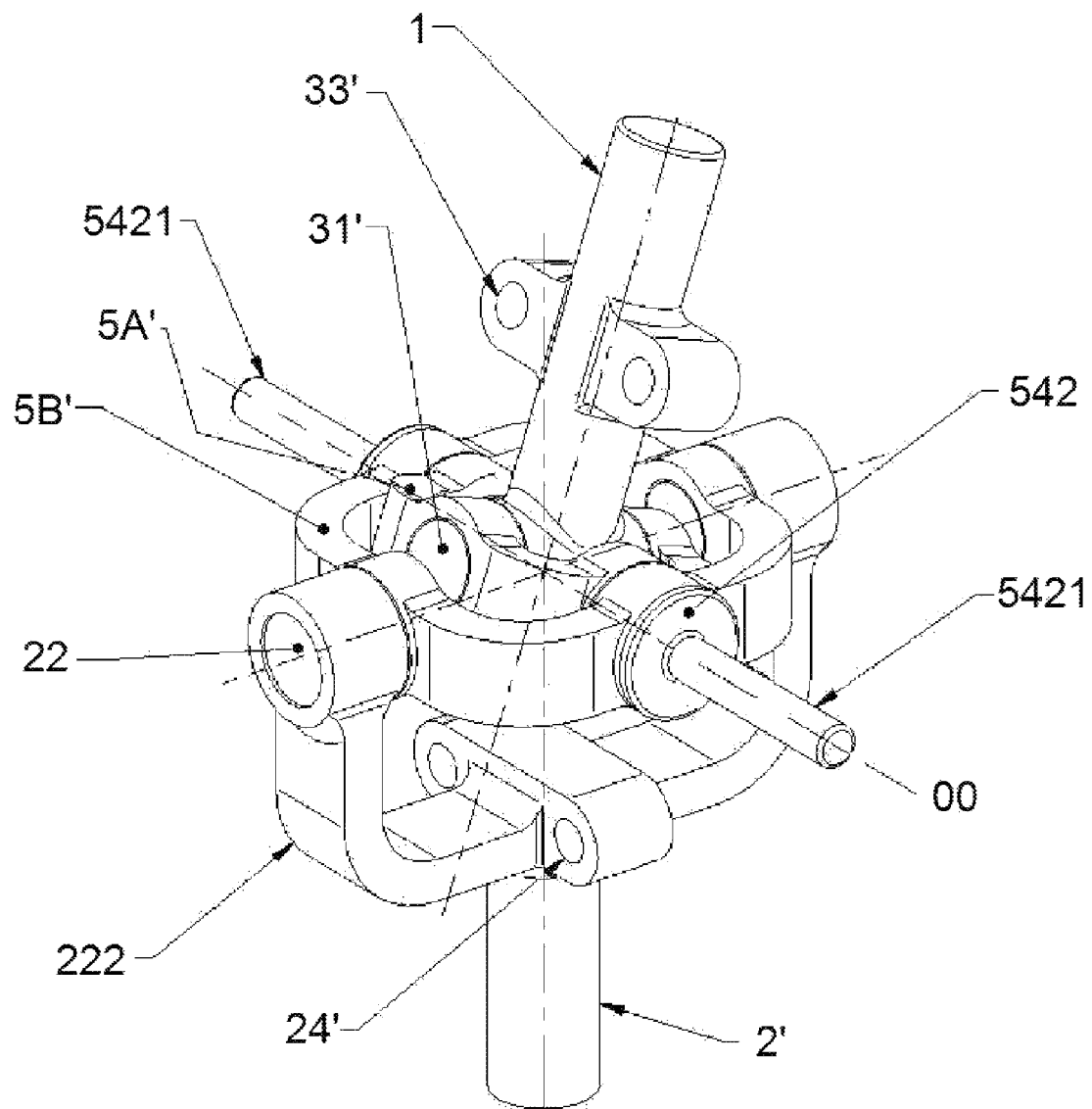

The driven shaft 2' of the rotor presents a yoke 222 connected to the pins 22 that are 460 integral to the said yoke by means of the provided slots, and are swivel on outer cardanic ring 5B; the driven shaft 2' has two 24' elements for connection to the connecting rods 63 (FIG. 11). In this embodiment, the internal cardanic ring 5A' and the external cardanic ring 5B' are each constituted by a single piece instead of an assembly of several elements and they are concentric. The concentric cardanic rings 5A', 5B1 are mutually connected with the connection swivel pins 542, each of which has a projecting end 5421 towards the outside of the joint (FIG. 12).

Each protruding end 5421 has a cylindrical shape and on each of them elements 61 and 62 of the bisector 6 are connected in sliding and rotational manner. Said elements 61, 62 of the bisector 6 together with the connecting rods 63, connected with the swivel pins respectively to the driving shaft 1 and the driven shaft 2', with a rhombic guide geometry, control bisectors 6, which maintain the connection pins 542 on a plane (homokinetic) that bisects the angle of inclination between said driving shaft and said driven shaft. In other words the innermost ring 5A' has two opposite seats to be revolute coupled with the pins 31; said two rings 5A' and 5B', concentric between them, are connected by swivel pins coaxial and opposites 542, resulting in the axis of the locations for the pins on the inner ring being normal to the axis of the pin 3 seats and, on the outer ring 5B', being the axis of the locations of said common pins normal to the axis of the pin seats 22; said pins 542 common to the two concentric rings are each equipped with a cylindrical end 5421 coaxial to the same pins; on that end sliding and rotating elements 61 and 62 coupled between them prismatically are provided; they connect, by means of equal connecting rods 63, respectively the element 61 and the support 33' provided on the driving shaft 1, and the element 62 to the support 24' provided on the driven shaft 2'.

The elements 61 and 62 constitute the bisectors that due to the rhombic geometry implemented by means of connecting rods 63, keep the axis of the common pins of the concentric rings on a plane which bisects the angle of inclination between the driven shaft and the driving shaft thus making the constant velocity joint. When the joint transmits a rotary motion accompanied by a non-zero torque, the bisector 6 are subjected to strains on connection pins 542, the strains being as strong as higher is the torque transmitted, and higher is the angle of inclination of the driven shaft with respect to the driving shaft because these strains are oscillating ones. The presence of two bisectors on both connecting pins 542 is used to favorably divide those strains on both bisectors.

Moreover, given the rigid coaxiality of connection pin 542 and the kinematic equivalence of the two bisector 6, the presence of two bisector 6 allows to obtain a 495 redundancy that allows the joint to function even in the event of failure of one of the two bisectors. Advantageously, due to the form of the couplings between the cardanic concentric rings with the driving shaft and the driven shaft, the joint is clearly reversible and the functions of said driving shaft 1 and driven shaft 2' can be exchanged.

The present invention has been described for illustrative but not limitative purposes, according to its preferred embodiments, but it is to be understood that variations and/or modifications may be made by those skilled in the art, without departing from the relevant scope of protection, as defined by the claims.

The invention claimed is:

1. A constant velocity universal joint apparatus for connecting a rotor hub of a multi-bladed helicopter with a drive shaft, the rotor hub tiltable in two directions of freedom with respect to the drive shaft about a flapping axis and a feathering axis of the blades, the blades being fixed to the rotor hub, the constant velocity universal joint apparatus comprising:

an internal universal ring couplable by a pair of pins to the drive shaft so as to rotate with the drive shaft;

an external universal ring couplable by a pair of swivel pins so as to rotate with the rotor hub, said internal and external universal ring connected to each other by a pair of connection pins so as to allow relative motion of said external universal ring with respect to said internal universal ring substantially in quadrature with said pair of rotating pins and with said pair of swivel pins, at least one of said pair of connection pins having an extremity extending outwardly coaxial with another of said pair of connections pins;

at least one bisector device having a first element and a second element, the bisector device connectable to the drive shaft and the rotor hub by a connecting rod, said first and second elements being coupled in a prismatic manner to each other, each of said first and second elements having at least one hole, the hole allowing a passing therein of the protruding extremity of the connector pin such that said first and second elements are connected in a sliding and swiveling manner on the protruding extremity of the connection pin, the bisector device maintaining an axis of the connection pin on a plane that bisects an angle between the drive shaft and the rotor hub so as to assure a constant transmission of a rotating motion between the drive shaft and the rotor hub when the rotor hub is tilted with respect to the drive shaft at an angle not equal to zero, said external universal ring comprising a first superior element and a second element each having two pairs of daps so as to form a site for permanent fitting of the respective connection pin and to form a site receiving a respective anti-friction bushing, the sites being aligned with each other, said internal universal ring having a superior element having four locations receiving an additional anti-friction bushing therein, said internal universal ring having a pair of elements each having a site for another anti-friction bushing and an additional pair of elements receiving anti-friction flanged bushings.

2. The constant velocity universal joint apparatus of claim 1, said connecting rod connectable to the drive shaft and to the rotor hub respectively with a first support and a second support so as to define a rhombic guide, said first and second supports transmitting a reciprocal position of the rotator hub and the drive shaft through the connecting rod to the bisector device.

* * * * *